US010781712B2

(12) United States Patent
Nakamura et al.

(10) Patent No.: US 10,781,712 B2
(45) Date of Patent: Sep. 22, 2020

(54) STEAM VALVE

(71) Applicant: KABUSHIKI KAISHA TOSHIBA, Minato-ku (JP)

(72) Inventors: Yuichi Nakamura, Yokohama (JP); Tomoo Oofuji, Yokohama (JP); Tsutomu Shioyama, Yokohama (JP); Takashi Iseki, Minato (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 16/436,129

(22) Filed: Jun. 10, 2019

(65) Prior Publication Data
US 2019/0292934 A1     Sep. 26, 2019

Related U.S. Application Data

(60) Division of application No. 15/287,145, filed on Oct. 6, 2016, now abandoned, which is a continuation of
(Continued)

(30) Foreign Application Priority Data

Apr. 8, 2014   (JP) ................................ 2014-079781

(51) Int. Cl.
*F01D 17/14* (2006.01)
*F01D 17/10* (2006.01)
(Continued)

(52) U.S. Cl.
CPC .......... *F01D 17/145* (2013.01); *F01D 17/10* (2013.01); *F01D 25/00* (2013.01); *F16K 1/12* (2013.01);
(Continued)

(58) Field of Classification Search
USPC ................... 251/359, 366, 367, 319
See application file for complete search history.

(56) References Cited

U.S. PATENT DOCUMENTS 8,020,383 B2    9/2011  Ooishi et al.
2009/0101859 A1 ‡  4/2009  Ooishi et al.

FOREIGN PATENT DOCUMENTS

CN    101418707 A  ‡  4/2009
EP    2 045 446 A2  ‡  4/2009
(Continued)

OTHER PUBLICATIONS

Japan (with English Abstract and corresponding to US, Apr. 23, 2009, Japan (with English Abstract and.‡
(Continued)

*Primary Examiner* — Daphne M Barry
(74) *Attorney, Agent, or Firm* — Oblon, McClelland, Maier & Neustadt, L.L.P.

(57) ABSTRACT

A steam valve 10 of an embodiment includes: a valve element 32 of a steam control valve 30, the valve element 32 being provided to be movable in an up and down direction; a valve element 42 of a main stop valve 40, the valve element 42 being provided under the valve element 32 coaxially with the valve element 32 to be movable in the up and down direction; a valve seat 60 with which the valve element 32 and the valve element 42 come into and out of contact; and a guide tube 43 slidably supporting a valve rod 41 including the valve element 42, and having a flange portion 43a at a bottom side in a casing 20. The steam valve 10 further includes: the casing 20 housing the valve element 32, the valve element 42, the valve seat 60, and the guide tube 43; a drain discharge hole 23 formed at a bottom side of the casing 20; a drain pipe 70 provided with a shutoff valve 71 and communicating with the drain discharge hole 23; and a flow direction changing part 80 which changes a
(Continued)

direction in which steam having passed between the valve element 32 and the valve seat 60 and flowing along the guide tube 43 flows toward the drain discharge hole 23.

5 Claims, 17 Drawing Sheets

Related U.S. Application Data application No. PCT/JP2015/001960, filed on Apr. 7, 2015.

(51) Int. Cl.
*F01D 25/00* (2006.01)
*F16K 1/30* (2006.01)
*F16K 1/44* (2006.01)
*F16K 51/00* (2006.01)
*F16K 1/12* (2006.01)

(52) U.S. Cl.
CPC .............. *F16K 1/307* (2013.01); *F16K 1/443* (2013.01); *F16K 1/446* (2013.01); *F16K 51/00* (2013.01); *F05D 2220/31* (2013.01)

(56) References Cited

FOREIGN PATENT DOCUMENTS

| JP | 58-122304 A | ‡ | 7/1983 |
|----|-------------|---|--------|
| JP | 60-14207 U | ‡ | 1/1985 |
| JP | 6-221107 | ‡ | 8/1994 |
| JP | 11-343811 | ‡ | 12/1999 |
| JP | 2006-46110 | ‡ | 2/2006 |
| JP | 2007-192168 | ‡ | 8/2007 |
| JP | 2009-85201 | | 4/2009 |
| JP | 2012-202249 A | ‡ | 10/2012 |

OTHER PUBLICATIONS

JPH 11-11343811, Translation from Espacenet, Jun. 23, 2018.‡
International Search Report dated Jul. 14, 2015 in PCT/JP2015/001960 filed on Apr. 7, 2015 (with English translation).
Written Opinion dated Jul. 14, 2015 in PCT/JP2015/001960 filed on Apr. 7, 2015.
International Preliminary Report on Patentability and Written Opinion dated Oct. 20, 2016 in PCT/JP2015/001960 (English translation only).
Extended European Search Report dated Nov. 29, 2017 in Patent Application No. 15776819.3.
Japanese Office Action dated Nov. 21, 2017 in Japanese Patent Application No. 2014-079781 (with unedited computer generated English translation).
Office Action dated Mar. 6, 2018 in Japanese Patent Application No. 2014-079781 with unedited computer generated English translation.
JP H11-343811, Translation from Espacenet. Jun. 23, 2018.

‡ imported from a related application

STEAM VALVE

CROSS-REFERENCE TO RELATED APPLICATIONS

This is a divisional of U.S. application Ser. No. 15/287,145, filed on Oct. 6, 2016, which is a continuation of International Application No. PCT/JP2015/001960 filed on Apr. 7, 2015, which is based upon and claims the benefit of priority from Japanese Patent Application No. 2014-079781 filed on Apr. 8, 2014; the entire contents of all of which are incorporated herein by reference.

FIELD

Embodiments described herein relate generally to a steam valve.

BACKGROUND

A steam turbine pipe system includes a main steam pipe which leads steam generated in a boiler to a steam turbine. In this main steam pipe, a steam valve for regulating a flow rate of the steam and shutting off the steam is provided.

FIG. 18 is a view illustrating a vertical cross section of a conventional steam valve 300. The conventional steam valve 300 provided in a main steam pipe is what is called a combined steam valve in which a steam control valve and a main stop valve are combined in one casing 310.

As illustrated in FIG. 18, the steam valve 300 includes: a steam control valve 320 movable in an up and down direction when driven from above; and a main stop valve 330 provided under the steam control valve 320 coaxially with the steam control valve 320 and movable in the up and down direction when driven from under. The steam valve 300 further includes a cylindrical strainer 340 disposed so as to surround the steam control valve 320 and the main stop valve 330. The strainer 340 prevents a foreign object in the steam led through a steam inlet 311 from flowing downstream.

The steam control valve 320 includes a valve rod 321 and a valve element 323. The valve rod 321 penetrates through an upper cover 350 and is movable in the up and down direction when driven from above. The valve element 323 is provided annularly on a lower end side of the valve rod 321 and has a dented portion 322 in its lower surface.

The main stop valve 330 includes a valve rod 331, a valve element 332, and a guide tube 333. The valve rod 331 penetrates through a bottom portion of the casing 310 and is movable in the up and down direction when driven from under. The valve element 332 is provided on an upper end side of the valve rod 331 and protrudes radially outward from the valve rod 331 all over the circumferential direction. The valve element 332 is housed in the dented portion 322 of the valve element 323 of the steam control valve 320. The guide tube 333 is a cylinder fixed to the bottom portion of the casing 310 and having the valve rod 331 penetrating therethrough at its center.

Under the valve element 323 of the steam control valve 320 and the valve element 332 of the main stop valve 330, a valve seat 360 which comes into contact with these valve elements is provided. When the valve element 323 of the steam control valve 320 and the valve element 332 of the main stop valve 330 are pressed while in contact with the valve seat 360, it is possible to shut off the flow of the steam.

At the bottom side of the casing 310, a drain discharge hole 312 for discharging a drain generated during warming for putting the steam turbine into operation is provided. As illustrated in FIG. 18, due to arrangement and structural reasons, the drain discharge hole 312 is formed in a sidewall of the casing 310 at the bottom side so as to extend laterally (in the horizontal direction in FIG. 18). Further, a drain pipe 370 is provided on the drain discharge hole 312 to lead the drain to the outside. A shutoff valve 380 is provided in the drain pipe 370. When the shutoff valve 380 is opened, the drain generated during the warming is led to a condenser. Then, the shutoff valve 380 is closed after the warming. That is, during the normal operation of the steam turbine, the drain pipe 370 constitutes a pipe part whose one end communicates with the inside of the steam valve 300 and whose other end is closed.

The steam valve 300 having such a structure is supplied with the steam superheated by a superheater of the boiler disposed upstream of the steam valve 300, through the steam inlet 311. The steam led through the steam inlet 311 passes through the strainer 340 to pass between the valve element 323 of the steam control valve 320 and the valve element 332 of the main stop valve 330, and the valve seat 360. Flows of the steam having passed downward in a through portion provided at the center of the valve seat 360 are bent along a steam passage downstream of the valve seat 360. Then, the steam is discharged through a steam outlet 313 to be led to a high-pressure turbine.

At this time, the flow rate of the steam is adjusted by a valve opening degree of the steam control valve 320. Specifically, when a required flow rate of the steam is small, the valve opening degree of the steam control valve 320 is small, and when the required flow rate of the steam is large, the valve opening degree of the steam control valve 320 is large. When the required flow rate of the steam is small, a gap between the valve element 323 of the steam control valve 320 and the valve seat 360 is narrow and thus the flows of the steam are narrowed in this gap. Then, a flow velocity of the steam increases.

Here, as illustrated in FIG. 18, partial steam F of the steam having passed between the valve element 323 of the steam control valve 320 and the valve seat 360 flows downward along a side surface of the guide tube 333. Then, the steam F flows along the shape of a flange portion 333a which is provided on the guide tube 333 at the bottom side of the casing 310 to protrude outward all over the circumference direction. At this time, a component of velocity directed outward is added, and as illustrated in FIG. 18, the steam F flows outward.

Part of the steam F spreading in the circumferential direction flows toward an opening 312a of the drain discharge hole 312. The drain pipe 370 is influenced by the steam F flowing toward the drain discharge hole 312. Then, during the normal operation of the steam turbine, pressure fluctuation occurs in the drain pipe 370 between the opening 312a of the drain discharge hole 312 and the shutoff valve 380.

In steam turbines, temperature and pressure of steam have recently been increased for higher efficiency. Further, downsizing and the like of devices are also being considered in order to reduce a manufacturing cost. These increase the flow velocity of the steam flowing between the valve element 323 of the steam control valve 320 and the valve seat 360 and the flow velocity of the steam flowing in the steam passage in the steam valve 300. This tends to increase the pressure fluctuation occurring in the drain pipe 370 due to the aforesaid steam F.

In the above-described conventional steam valve 300, the operation under a narrowed valve opening degree of the steam control valve 320, that is, under a low flow rate of the steam passing through the steam valve 300, sometimes causes an abnormal temperature increase of the drain pipe 370 more on the steam valve 300 side than the shutoff valve 380. A possible reason for this to occur may be a thermoacoustic effect caused by the pressure fluctuation in the drain pipe 370. Such an abnormal temperature increase may cause breakage of the drain pipe.

DETAILED DESCRIPTION

Hereinafter, embodiments of the present invention are described with reference to the drawings.

A steam valve of an embodiment includes: a first valve element which is provided to be movable in an up and down direction and adjusts a flow rate of steam; a second valve element which is provided under the first valve element coaxially with the first valve element to be movable in the up and down direction and shuts off a flow of the steam; a valve seat with which the first valve element and the second valve element come into and out of contact; and a guide tube slidably supporting a valve rod including the second valve element, and having a flange portion protruding outward all over the circumferential direction, at a bottom side in the steam valve.

The steam valve further includes: a casing housing the first valve element, the second valve element, the valve seat, and the guide tube; a drain discharge hole formed in a sidewall of the casing at a bottom side; a drain pipe provided with a shutoff valve and communicating with the drain discharge hole; and a flow direction changing part which changes a direction in which the steam having passed between the first valve element and the valve seat and flowing along the guide tube, flows toward the drain discharge hole.

First Embodiment

Figure 1:
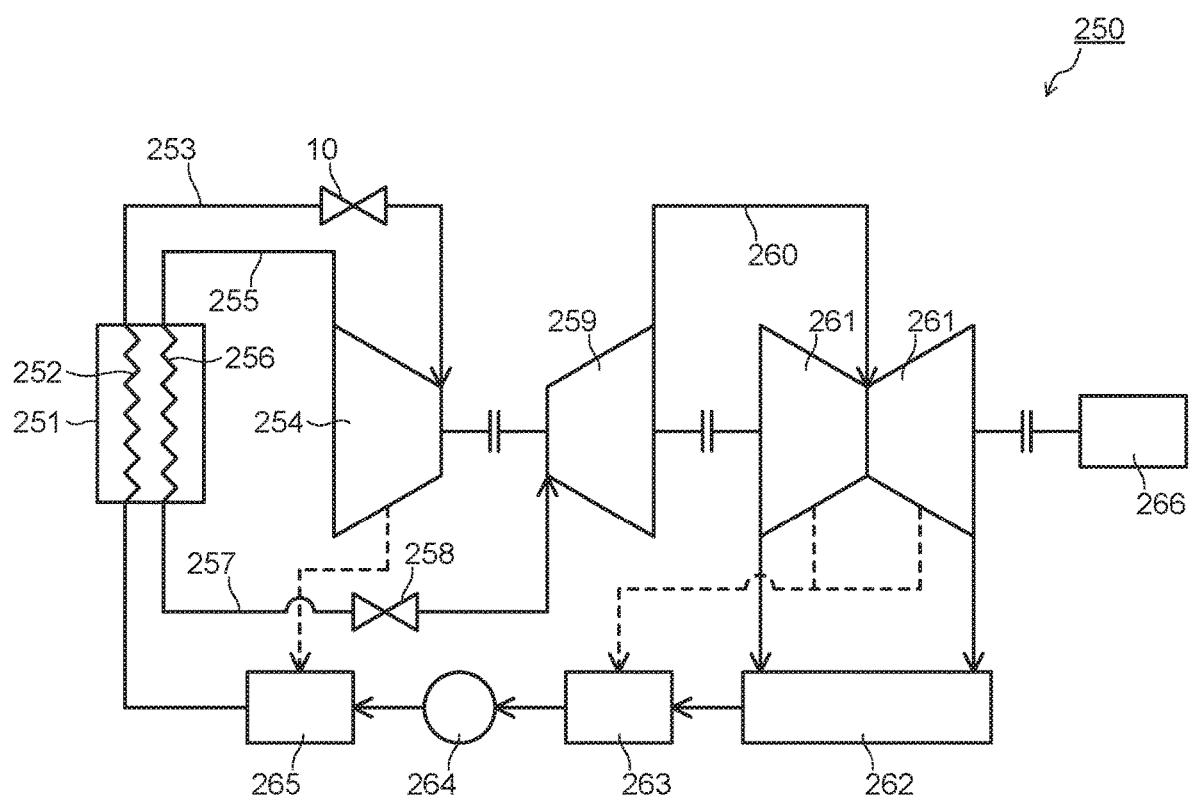
FIG. 1 is a system diagram illustrating an example of a power generation plant including a steam valve of a first embodiment.

FIG. 1 is a system diagram illustrating an example of a power generation plant 250 including a steam valve 10 of a first embodiment.

As illustrated in FIG. 1, in the power generation plant 250, steam heated in a superheater 252 of a boiler 251 is led to a high-pressure turbine 254 via a main steam pipe 253 and the steam valve 10 provided in the main steam pipe 253. Note that the steam valve 10, which will be describe later, is a combined steam valve having functions of a main stop valve and a steam control valve.

Here, for example, in a combined cycle system in which a gas turbine and a steam turbine are combined, the boiler 251 functions as an exhaust heat recovery boiler. In this case, the boiler 251 functions by using exhaust gas from the gas turbine. In a case where the combined cycle system including the gas turbine is not constituted, the boiler 251 burns, for example, a fossil fuel to use its heat.

The steam having worked in the high-pressure turbine 254 passes through a low-temperature reheat pipe 255 to be reheated in a reheater 256 of the boiler 251 and is led to an intermediate-pressure turbine 259 via a high-temperature reheat pipe 257 and a reheat steam valve 258 provided in the high-temperature reheat pipe 257.

The steam having worked in the intermediate-pressure turbine 259 is led to low-pressure turbines 261 via a crossover pipe 260. The steam having worked in the low-pressure turbines 261 is returned to water in a condenser 262. Then, the water is supplied again to the superheater 252 of the boiler 251 by a feed pump 264 via a low-pressure feedwater heater 263 and a high-pressure feedwater heater 265. Further, for example, the high-pressure turbine 254, the intermediate-pressure turbine 259, and the low-pressure turbines 261 drive a power generator 266 to make it generate power.

Note that the structure of the power generation plant 250 described here is an example, and its structure is not limited to this.

Next, the structure of the steam valve 10 of the first embodiment is described.

Figure 2:
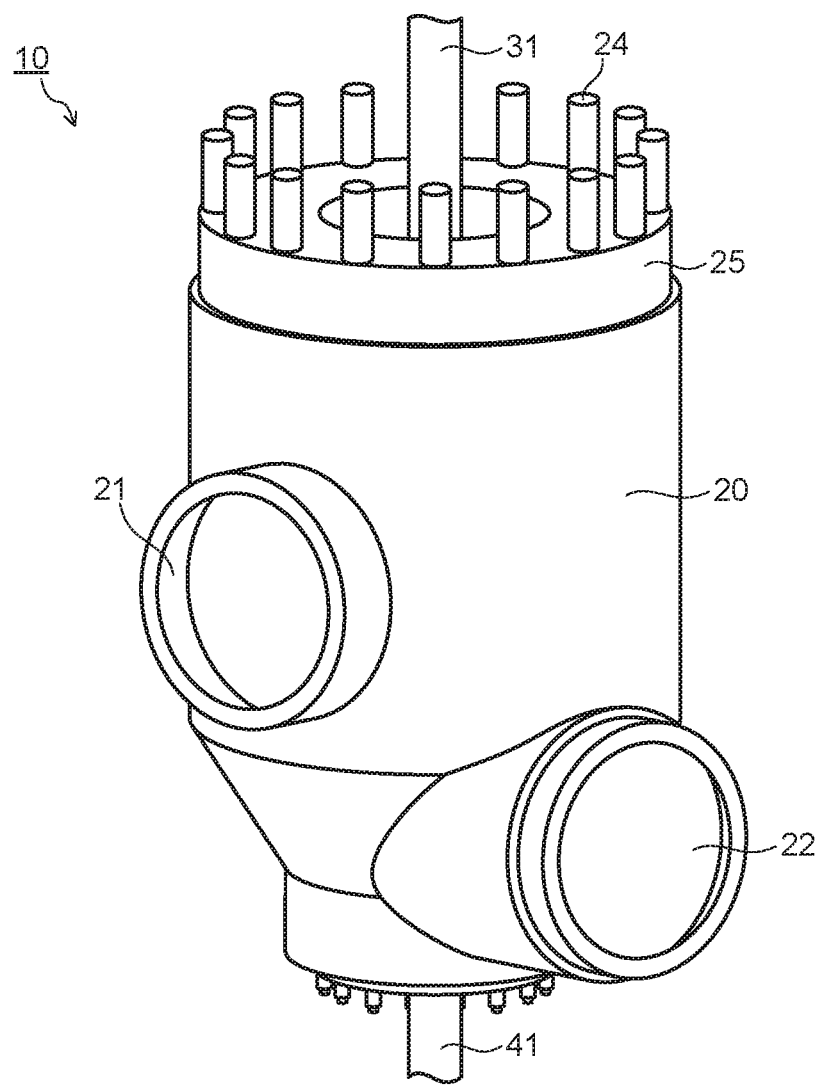
FIG. 2 is a perspective view of the steam valve of the first embodiment.
Figure 3:
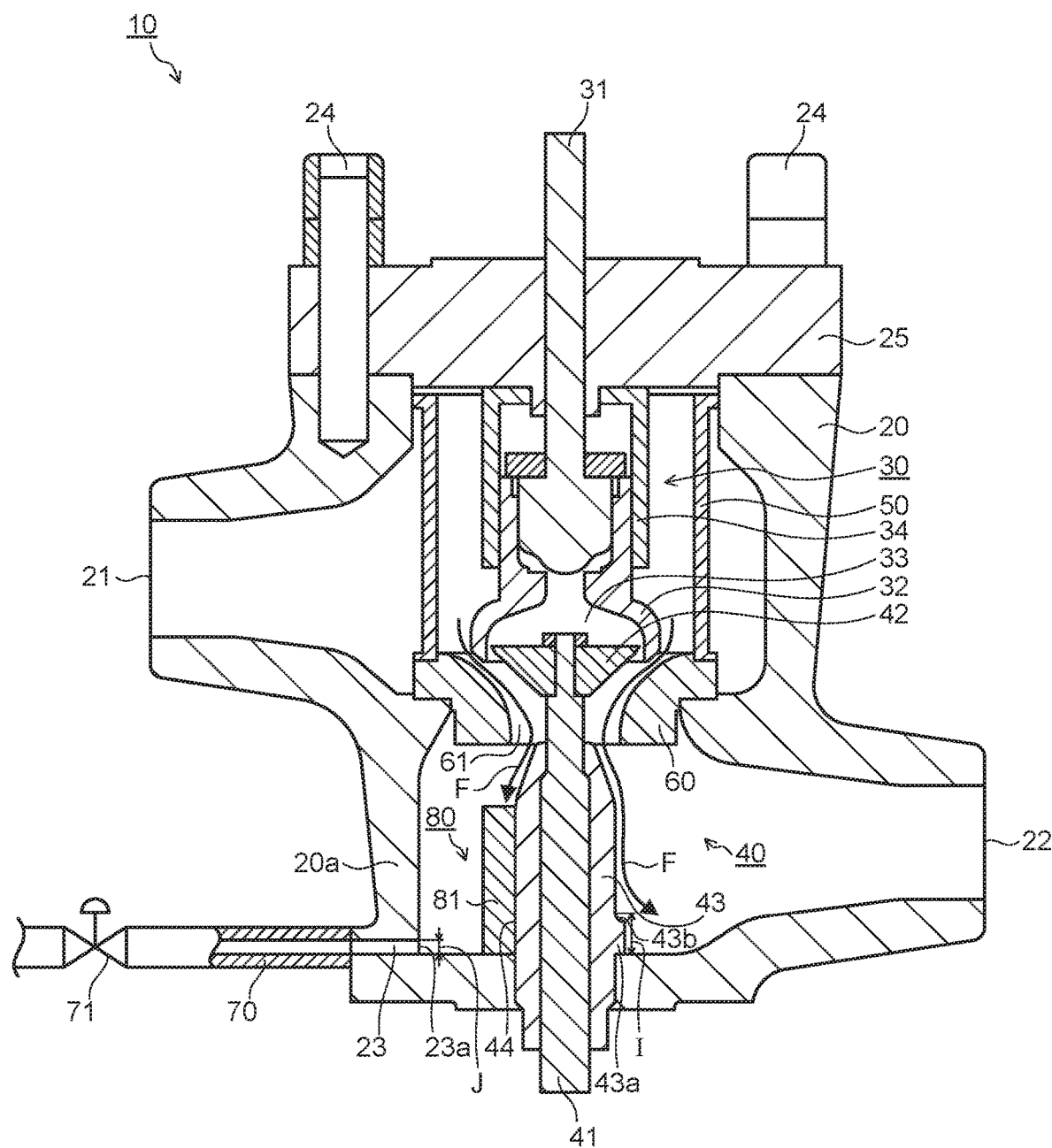
FIG. 3 is a view illustrating a vertical cross section of the steam valve of the first embodiment.
Figure 4:
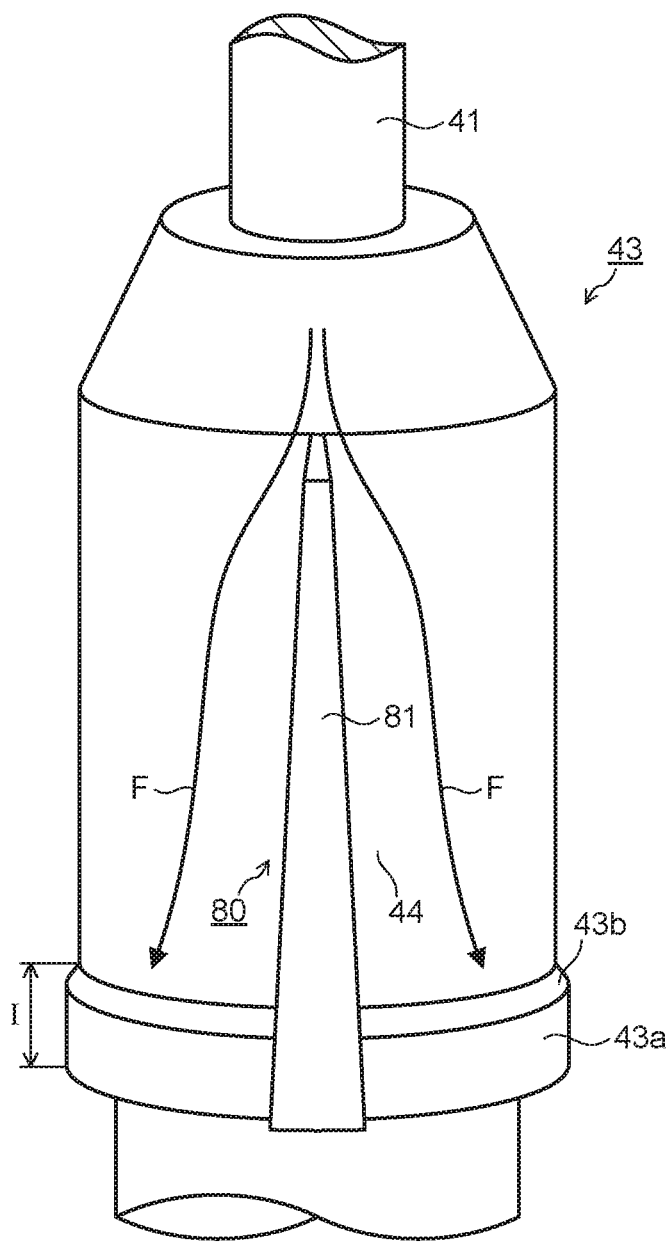
FIG. 4 is a perspective view of a flow direction changing part in the steam valve of the first embodiment.

FIG. 2 is a perspective view of the steam valve 10 of the first embodiment. FIG. 3 is a view illustrating a vertical cross section of the steam valve 10 of the first embodiment. FIG. 4 is a perspective view of a flow direction changing part 80 in the steam valve 10 of the first embodiment. Note that the steam valve 10 described here is the combined steam valve having the functions of the main stop valve and the steam control valve, which is provided in the main steam pipe.

As illustrated in FIG. 2 and FIG. 3, the steam valve 10 of the first embodiment includes a casing 20 forming a steam passage in which the steam led through a steam inlet 21 in, for example, a horizontal direction is led vertically downward, and the steam led vertically downward is led in, for example, the horizontal direction to flow out through a steam outlet 22. An upper cover 25 covering the casing 20 from above is coupled to the top of the casing 20 with fixing bolts 24. The upper cover 25 thus coupled to the casing 20 with the fixing bolts 24 prevents the steam flowing in the casing 20 from leaking outside.

As illustrated in FIG. 3, the casing 20 includes therein a steam control valve 30 movable in an up and down direction when driven from above and a main stop valve 40 provided under the steam control valve 30 coaxially with the steam control valve 30 and movable in the up and down direction when driven from under. The casing 20 further includes therein a cylindrical strainer 50 disposed so as to surround the steam control valve 30 and the main stop valve 40. The strainer 50 prevents a foreign object in the steam led through the steam inlet 21 from flowing downstream. The strainer 50 is, for example, a porous member or a porous plate.

The steam control valve 30 adjusts a flow rate of the steam. In order to shut off the flow of the steam, the steam control valve 30 is closed. The steam control valve 30 includes a valve rod 31 and a valve element 32. The valve rod 31 penetrates through the upper cover 25 and is supported to be movable in the up and down direction when driven from above. The valve element 32 is annularly provided on a lower end side of the valve rod 31 and has a dented portion 33 in its lower surface. Around the outer periphery of the valve element 32, a cylindrical guide 34 which guides the up and down movement of the valve element 32 is provided. The valve element 32 functions as a first valve element.

The main stop valve 40 shuts off the flow of the steam. The main stop valve 40 includes a valve rod 41, a valve element 42, and a guide tube 43. The valve rod 41 penetrates through a bottom portion of the casing 20 and is supported so as to be movable in the up and down direction when driven from under. The valve element 42 is provided on an upper end side of the valve rod 41 and protrudes radially outward from the valve rod 41 all over the circumferential direction. The valve element 42 is housed in the dented portion 33 of the valve element 32 of the steam control valve 30. That is, the valve element 42 is capable of entering and exiting from the dented portion 33 of the valve element 32. The valve element 42 functions as a second valve element.

The guide tube 43 is fixed to the bottom potion of the casing 20 and is a cylinder at the center of which the valve rod 41 slidably penetrates therethrough. The guide tube 43 supporting the valve rod 41 enables the main stop valve 40 to stably move in the up and down direction.

The guide tube 43 includes a flange portion 43a protruding outward all over the circumferential direction, at the bottom portion side of the casing 20. An upper end portion of the flange portion 43a is, for example, a slanting surface 43b slanting downward as illustrated in FIG. 3 and FIG. 4. The shape of the upper end portion of the flange portion 43a is not limited to this and may be a curved surface protruding downward, for instance.

A height I of the flange portion 43a is an axial-direction distance between a lower end of the flange portion 43a in contact with a bottom surface of the casing 20 and an upper end of the flange portion 43a. The height I of the flange portion 43a is, for example, less than about three times an axial-direction distance J between the bottom surface of the casing 20 and an upper end of a later-described drain discharge hole 23.

Under the valve element 32 of the steam control valve 30 and the valve element 42 of the main stop valve 40, a valve seat 60 which comes into contact with these valve elements is provided. The valve seat 60 has a hollow annular shape having a steam passage 61 at its center. For example, when the valve element 32 of the steam control valve 30 and the valve element 42 of the main stop valve 40 are pressed while in contact with the valve seat 60, the flow of the steam can be shut off.

The casing 20 has, at its bottom side, the drain discharge hole 23 which discharges a drain generated during warming for putting the steam turbine into operation. As illustrated in FIG. 3, the drain discharge hole 23 is formed in a sidewall 20a of the casing 20 at the bottom side to extend laterally (in FIG. 3, a left horizontal direction) because of arrangement and structural reasons.

A drain pipe 70 which leads the drain outside is provided so as to communicate with the drain discharge hole 23. The drain pipe 70 on the drain discharge hole 23 side is disposed in a substantially horizontal direction, for instance. Note that the substantially horizontal direction includes not only the horizontal direction but also a direction inclined downward by about 0.5 to 2 degrees so as to make the drain flow down. The drain pipe 70 is provided with a shutoff valve 71.

When the shutoff valve 71 is opened, the drain generated during the warming is led to the condenser. Then, the shutoff valve 71 is closed after the warming. That is, while the steam turbine is in operation, the drain pipe 70 constitutes a pipe part whose one end communicates with the inside of the steam valve 10 and whose other end is closed.

The steam valve 10 further includes a flow direction changing part 80 which changes a direction in which the steam having passed between the valve element 32 of the steam control valve 30 and the valve seat 60 flows toward the drain discharge hole 23. Here, an example where the flow direction changing part 80 is provided on a side surface 44 of the guide tube 43 is described.

As illustrated in FIG. 3 and FIG. 4, the side surface 44 of the guide tube 43 has, on its drain discharge hole side, a ridge part 81 protruding outward and extending in the axial direction. As illustrated in FIG. 3, a downstream end portion of the ridge part 81 faces the drain discharge hole 23. The ridge part 81 functions as the flow direction changing part 80. Note that FIG. 4 is a view of the flow direction changing part 80 seen from the drain discharge hole 23 side.

The ridge part 81 has a wider circumferential width as it goes more downstream as illustrated in FIG. 4, for instance. In the example here, the ridge part 81 has a rectangular axial-direction cross section as illustrated in FIG. 3, but the axial-direction cross sectional shape of the ridge part 81 is not limited to any particular shape. The ridge part 81 only needs to have a ridge shape capable of dividing the steam F flowing along the guide tube 43, at an upper portion of the guide tube 43. For example, the ridge part 81 may have a larger protrusion height as it goes more downstream. In this case, the cross sectional shape of the ridge part 81 in the cross section in FIG. 3 is trapezoidal.

Owing to the presence of the ridge part 81, the steam F flowing along the guide tube 43 can be divided at the ridge part 81 as a boundary. Further, since the ridge part 81 has a larger circumferential width as it goes more downstream, the direction of the steam F flowing toward the drain discharge hole 23 facing the downstream end of the ridge part 81 can be surely changed at the downstream end. In other words, the increase of the circumferential width of the ridge potion 81 as it goes more downstream makes it possible to divide the flow of the steam F in a direction in which the steam F gets more away from the drain discharge hole 23.

Figure 5:
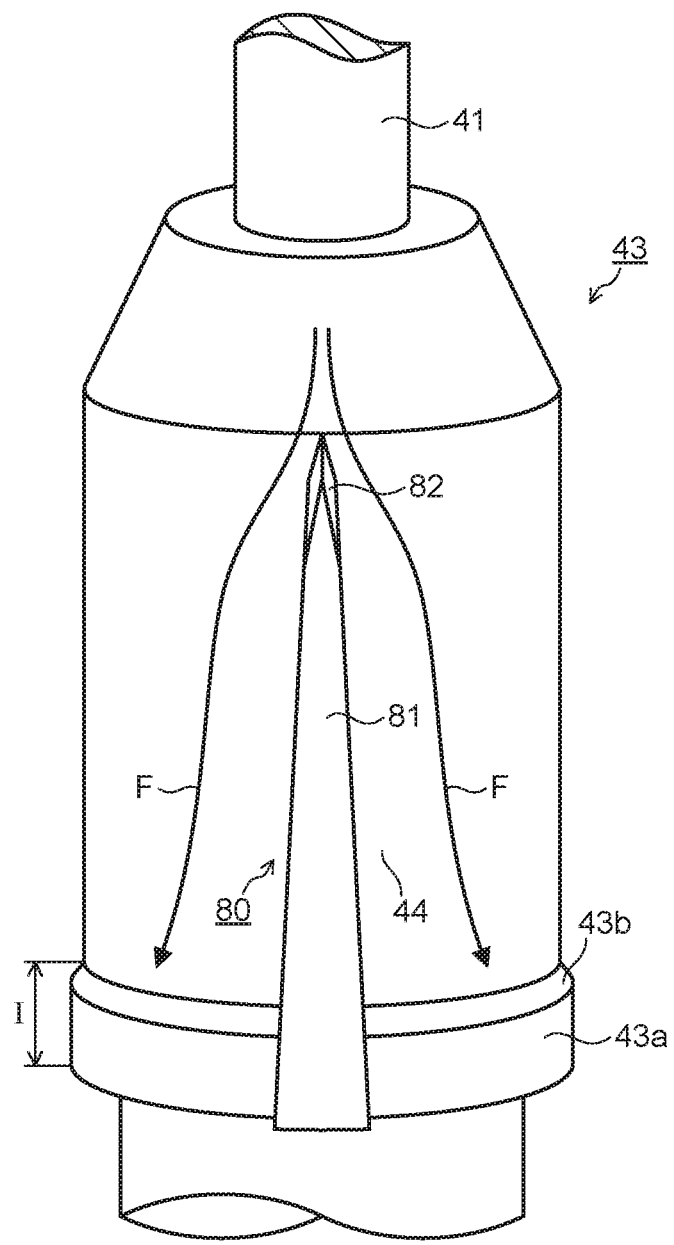
FIG. 5 is a perspective view of the flow direction changing part with another structure, in the steam valve of the first embodiment.

FIG. 5 is a perspective view of the flow direction changing part 80 having another structure, in the steam valve 10 of the first embodiment. Note that FIG. 5 is a view of the flow direction changing part 80 seen from the drain discharge hole 23 side.

As illustrated in FIG. 5, in an upper end portion 82 of the ridge part 81, the circumferential width of the end portion 82 may be reduced in a tapered manner, for instance. This structure enables the smooth division of the flow at a branching part of the flow of the steam F, that is, at the end portion 82. This can reduce a pressure loss in the end portion 82.

Next, the flow of the steam in the steam valve 10 is described.

For example, the steam superheated by the superheater 252 of the boiler 251 illustrated in FIG. 1 is supplied through the steam inlet 21 illustrated in FIG. 3. The steam led through the steam inlet 21 passes through the strainer 50 and passes between the valve element 32 of the steam control valve 30 and the valve element 42 of the main stop valve 40, and the valve seat 60.

At this time, the main stop valve 40 is fully opened, for instance. That is, a gap between the valve element 42 of the main stop valve 40 and the valve seat 60 is set to the maximum. Further, the opening degree of the steam control valve 30 is set according to a required flow rate of the steam. That is, the opening degree is adjusted according to the flow rate of the steam that is to flow in the gap between the valve element 32 of the steam control valve 30 and the valve seat 60. Here, a description is given, assuming a condition under which the temperature of the drain pipe 70 is likely to be abnormal, that is, a case where the flow rate of the steam that is to flow is small. In this case, the valve opening degree of the steam control valve 30 is small.

In the case where the valve opening degree of the steam control valve 30 is small, the gap between the valve element 32 of the steam control valve 30 and the valve seat 60 is narrow and thus the flow of the steam is narrowed in this gap. Then, the velocity of the steam increases. Partial steam F of the steam having passed between the valve element 32 of the steam control valve 30 and the valve seat 60 flows down along the side surface of the guide tube 43 as illustrated in FIG. 3 and FIG. 4.

Out of the flows of the steam F along the side surface of the guide tube 43, the flow of the steam F reaching the ridge part 81 branches off at the ridge part 81 as the boundary. In FIG. 4, the flow branches off to left and right of the ridge part 81 as the boundary. The steam F that has branched off flows so as to be more apart from the ridge part 81 as it goes more downstream.

Accordingly, at the downstream end of the ridge part 81, there occurs no flow of the steam F toward the drain discharge hole 23 facing the downstream end. Consequently, since pressure fluctuation of the flow of the steam F is not transmitted to the drain pipe 70 via the drain discharge hole 23, the abnormal temperature increase of the drain pipe 70 can be prevented. Here, the flow of the steam F toward the drain discharge hole 23 refers to a flow of the steam flowing into an opening 23a of the drain discharge hole 23 mainly due to a dynamic pressure of the flow (the same applies to the below).

The steam F having branched off then flows toward the steam outlet 22 together with other steam. The steam discharged through the steam outlet 22 is led to the high-pressure turbine 254.

Here, the description has been given assuming the case where the valve opening degree of the steam control valve 30 is small, but the same operation and effect can also be obtained in a case where the valve opening degree of the steam control valve 30 is large.

Here, a reason why the abnormal temperature increase of the drain pipe 70 can be prevented by not transmitting the pressure fluctuation of the flow of the steam F to the drain pipe 70 is described.

Here, the frequency of pipe pressure fluctuation of a cylinder whose inside diameter is R is represented by f(Hz). In general, a heat flux q (W/m$^2$) generated by a thermoacoustic effect due to pressure fluctuation in a boundary layer near a pipe wall is found by the expression (2), using a relation of the expression (1) in which a pipe pressure fluctuation amplitude P is divided by a pipe average pressure $P_0$ and the obtained value is made dimensionless (e.g. Arakawa, Kawahashi, Transactions of the Japan Society of Mechanical Engineers, Vol. 62 No. 598, B(1996), p. 2238-2245).

[exp. 1]
$$P_1 = P/P_0 \qquad \text{expression (1)}$$

[exp. 2]
$$q = K \times \left(\frac{1}{\gamma}\right)^2 \left(\frac{\mu a^2}{\delta/5}\right) P_1^2 \qquad \text{expression (2)}$$

Here, $P_1$ is a dimensionless pressure amplitude, K is a constant determined by a pipe shape, γ is a specific heat ratio, μ is a coefficient of viscosity, a is a sound velocity, and δ is the thickness of the boundary layer.

Since the inner perimeter of the cylinder is πR, a heat generation amount Q (W/m) per unit length of the cylinder is found by the expression (3).

[exp. 3]
$$Q = K \times \left(\frac{1}{\gamma}\right)^2 \left(\frac{\mu a^2}{\delta/5}\right) P_1^2 \pi R \qquad \text{expression (3)}$$

Here, if an angular frequency ω is 2πf, the thickness δ of the boundary layer is found by the expression (4).

[exp. 4]
$$\delta = 5\sqrt{\frac{\nu}{\omega}} \qquad \text{expression (4)}$$

Here, υ is a coefficient of kinematic viscosity.

As is apparent from the expression (3), the heat generation (thermoacoustic effect) due to the pipe pressure fluctuation is proportional to a square of the dimensional pressure amplitude. This shows that reducing the pipe pressure fluctuation can reduce the heat generation.

As described above, according to the steam valve 10 of the first embodiment, the presence of the flow direction changing part 80 (ridge part 81) can prevent the pressure fluctuation of the flow of the steam F along the side surface of the guide tube 43 from being transmitted to the drain pipe 70 via the drain discharge hole 23. This can prevent the abnormal temperature increase of the drain pipe 70, enabling to provide the highly reliable steam valve 10.

Second Embodiment

Figure 6:
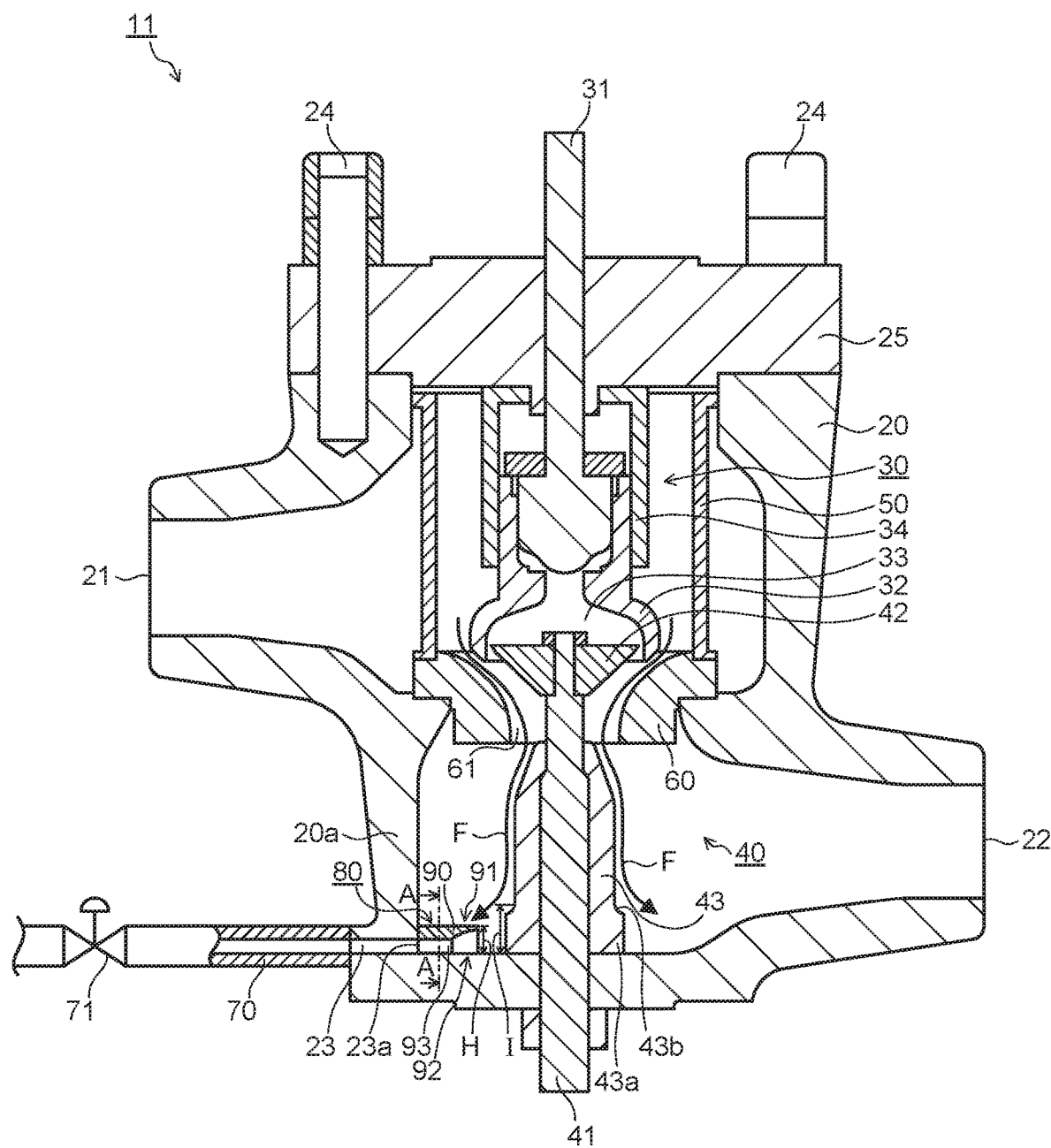
FIG. 6 is a view illustrating a vertical cross section of a steam valve of a second embodiment.
Figure 7:
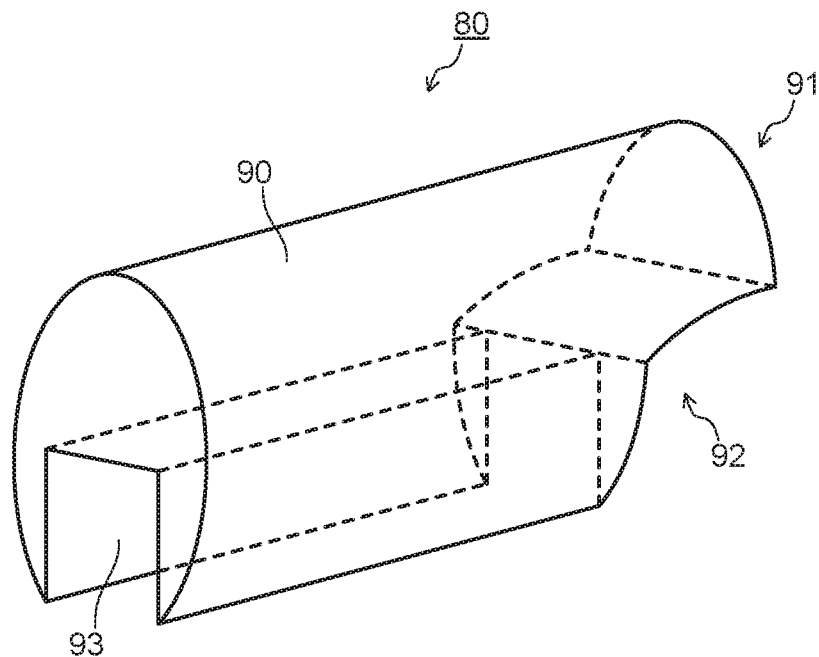
FIG. 7 is a perspective view of a flow direction changing part in the steam valve of the second embodiment.
Figure 8:
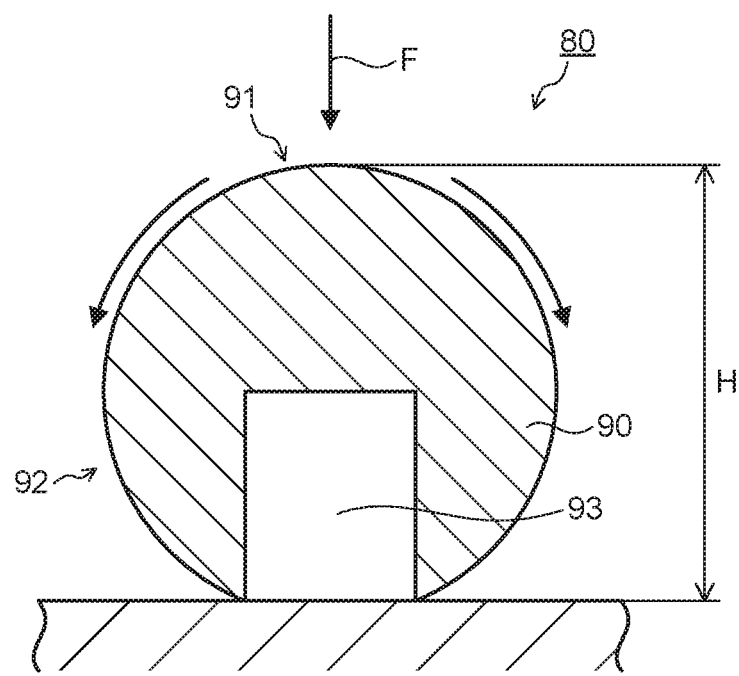
FIG. 8 is a view illustrating an A-A cross section in FIG. 6.

FIG. 6 is a view illustrating a vertical cross section of a steam valve 11 of a second embodiment. FIG. 7 is a perspective view of a flow direction changing part 80 in the steam valve 11 of the second embodiment. FIG. 8 is a view illustrating an A-A cross section in FIG. 6. Note that, in the following embodiment, the same components as those in the structure of the steam valve 10 of the first embodiment are denoted by the same reference signs and duplicated description is not given or simplified.

The structure of the steam valve 11 of the second embodiment is the same as the structure of the steam valve 10 of the first embodiment except the structure of the flow direction changing part 80. Therefore, the flow direction changing part 80 is mainly described here.

As illustrated in FIG. 6 to FIG. 8, the flow direction changing part 80 includes a tubular body 90 whose one end is coupled to the drain discharge hole 23 and whose other end has an upper half tip 91 protruding in the length direction (longitudinal direction) beyond its lower half tip 92. The flow direction changing part 80 further includes a communication hole 93 formed in the tubular body 90 in the length direction and communicating with the drain discharge hole 23. For example, the communication hole 93 can be formed on a lower half side of the tubular body 90 all along the length direction. For example, the tubular body 90 is constituted by forming the communication hole 93 in a column whose other end has the aforesaid shape.

Here, assuming, for example, that the cross sectional shape is a circle in the cross section illustrated in FIG. 8, the upper half side refers to an upper side of the circle two-divided vertically by a horizontal straight line passing the center of the circle. Assuming that the cross sectional shape in the cross section illustrated in FIG. 8 is a circle, the lower half side refers to a lower side of the circle two-divided vertically by the horizontal straight line passing the center of the circle.

An end portion of the communication hole 93 on a side different from the drain discharge hole 23 side opens in the steam valve 11. However, since the upper half tip 91 of the tubular body 90 protrudes toward the guide tube 43 beyond the lower half tip 92, the end portion of the communication hole 93 on, for example, the tip side cannot be seen from above. Incidentally, the drain generated during the warming for putting the steam turbine into operation passes through the communication hole 93 to flow into the drain discharge hole 23.

The tubular body 90 has a cylindrical shape, for instance. As illustrated in FIG. 6, a height H of the tubular body 90 is smaller than the height I of the flange portion 43a of the guide tube 43. The tubular body 90 is fixed to the bottom surface of the casing 20 by welding or the like, for instance. Further, the example where the cross section of the communication hole 93 is rectangular is given here, but this cross section may be circular.

In the steam valve 11 including such a flow direction changing part 80, the partial steam F of the steam having passed between the valve element 32 of the steam control valve 30 and the valve seat 60 flows along the side surface of the guide tube 43. When the steam F flows along the flange portion 43a of the guide tube 43, a component of velocity directed outward is added, and as illustrated in FIG. 6, the steam F flows outward. Part of the flow of the steam F flowing outward flows down onto the tubular body 90 to flow along an outer surface of the tubular body 90. At this time, the flow of the steam F collides with the top of the tubular body 90, and as illustrated in FIG. 8, branches off. In FIG. 8, the flow of the steam F branches off to left and right of the tubular body 90. That is, the flow direction of the steam F is changed by the tubular body 90.

The steam F flowing down onto the tubular body 90 thus once collides with the tubular body 90 to be changed in its flow direction. The height H of the tubular body 90 is smaller than the height I of the flange portion 43a of the guide tube 43, and the tip-side end portion of the communication hole 93 is covered by the protruding upper half tip 91. Accordingly, the flow of the steam F toward the communication hole 93 does not occur. Consequently, since the pressure fluctuation of the flow of the steam F is not transmitted to the drain pipe 70 via the communication hole 93 and the drain discharge hole 23, the abnormal temperature increase of the drain pipe 70 can be prevented.

As described above, according to the steam valve 11 of the second embodiment, the presence of the flow direction changing part 80 can prevent the pressure fluctuation of the flow of the steam F along the side surface of the guide tube 43 from being transmitted to the drain pipe 70 via the drain discharge hole 23. This can prevent the abnormal temperature increase of the drain pipe 70, enabling to provide the highly reliable steam valve 11.

Third Embodiment

Figure 9:
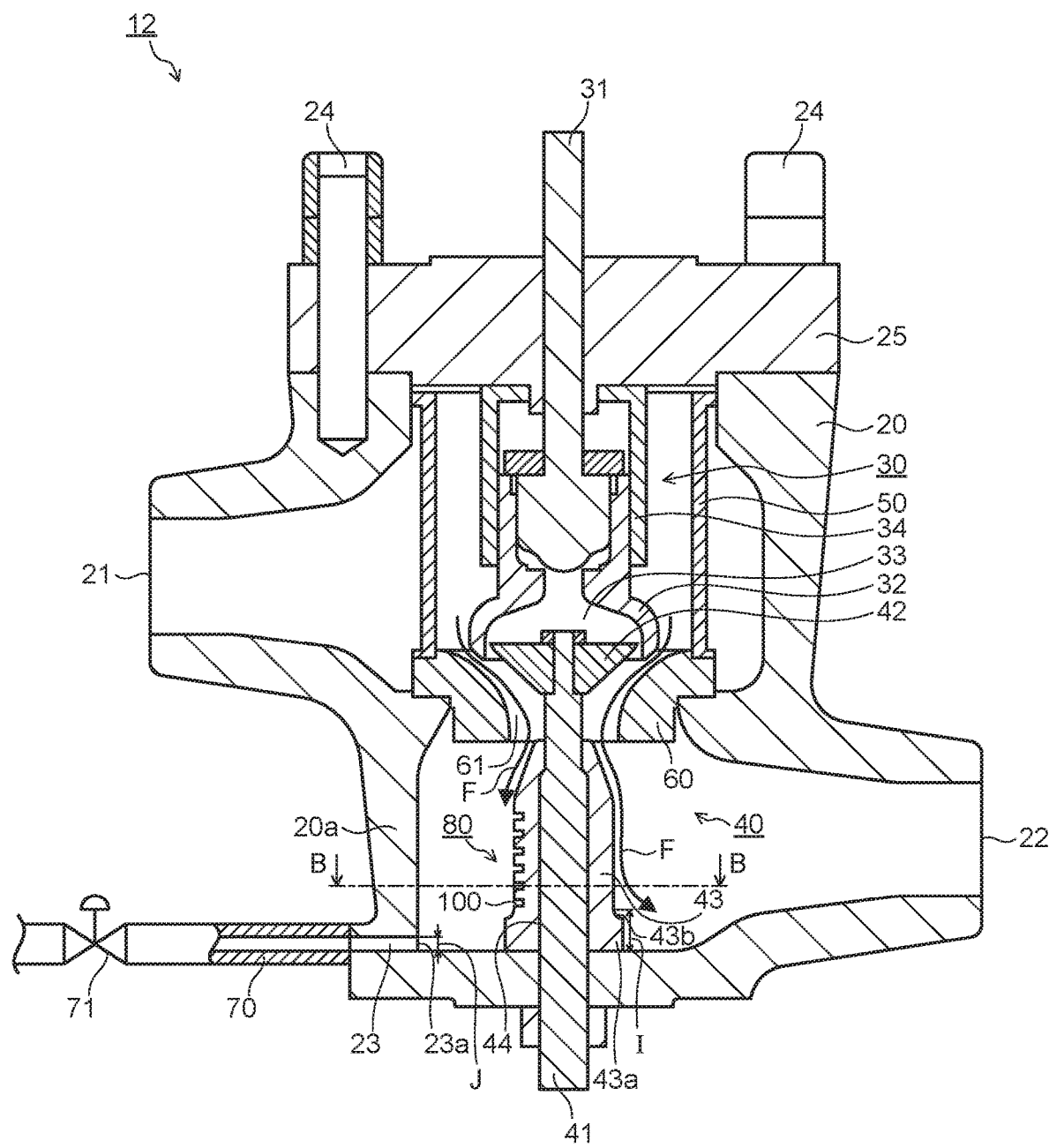
FIG. 9 is a vertical cross-sectional view of a steam valve of a third embodiment.
Figure 10:
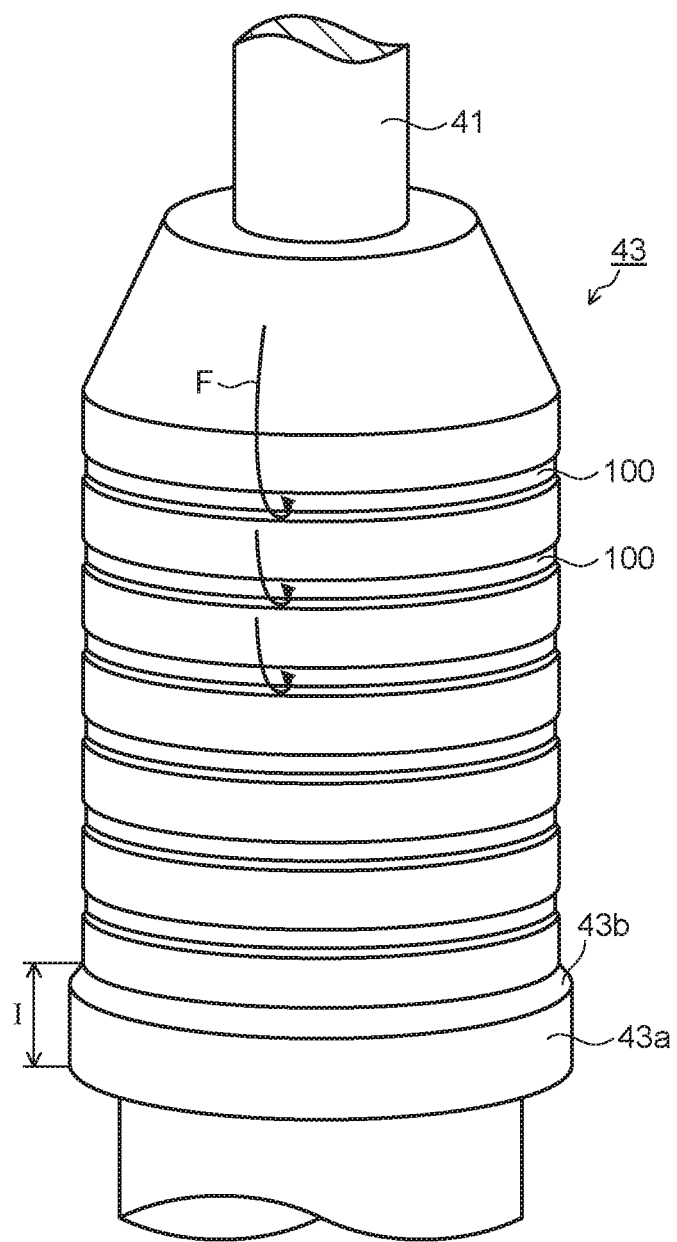
FIG. 10 is a perspective view of a flow direction changing part in the steam valve of the third embodiment.
Figure 11:
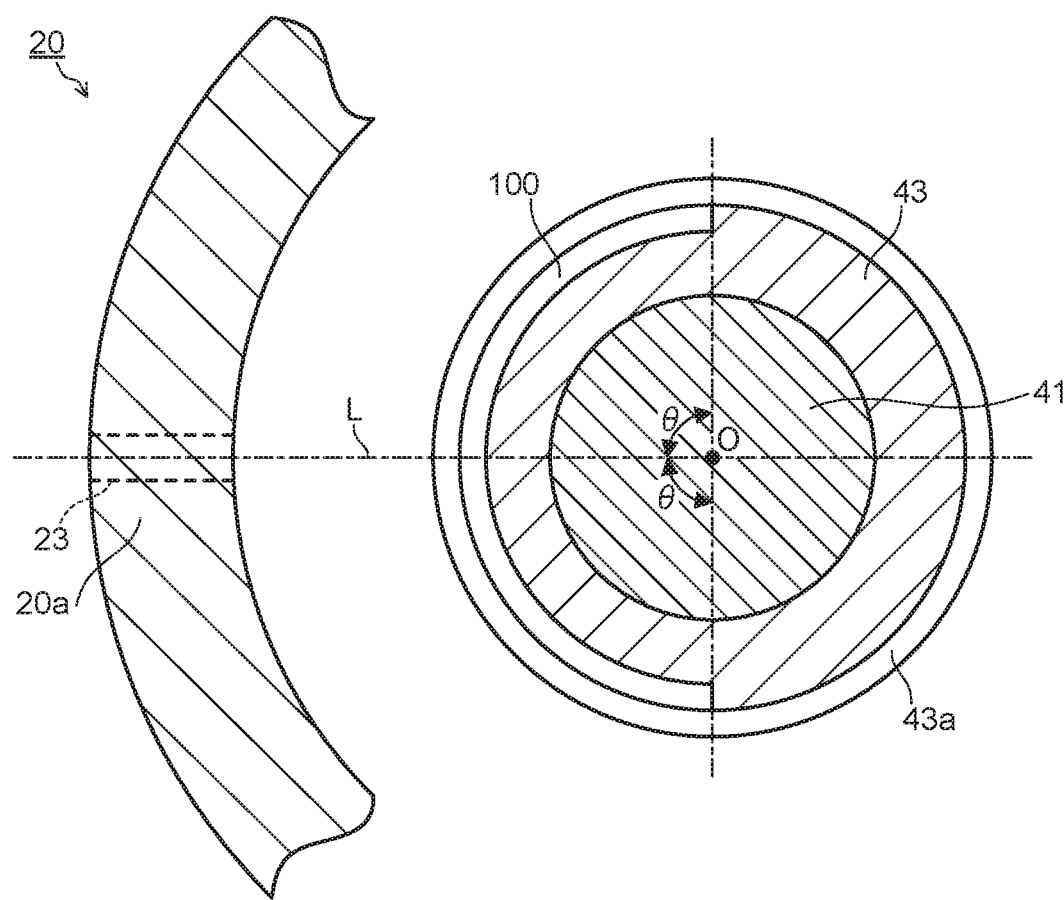
FIG. 11 is a view illustrating a B-B cross-section in FIG. 9.

FIG. 9 is a view illustrating a vertical cross section of a steam valve 12 of a third embodiment. FIG. 10 is a perspective view of a flow direction changing part 80 in the steam valve 12 of the third embodiment. Note that FIG. 10 is a view of the flow direction changing part 80 seen from the drain discharge hole 23 side. FIG. 11 is a view illustrating a B-B cross section in FIG. 9

The structure of the steam valve 12 of the third embodiment is the same as the structure of the steam valve 10 of the first embodiment except the structure of the flow direction changing part 80. Therefore, the flow direction changing part 80 is mainly described here.

As illustrated in FIG. 9 and FIG. 10, the flow direction changing part 80 includes groove portions 100 formed in the side surface of the guide tube 43 on the drain discharge hole 23 side and arranged in the axial direction in a plurality of tiers. For example, these groove portions 100 are each formed along a half circumference of the side surface of the guide tube 43 which is the cylinder, that is, along ½ of the circumference.

Here, the side surface of the guide tube 43 on the drain discharge hole 23 side is described. As illustrated in FIG. 11, a straight line parallel to the center line of the drain discharge hole 23 and passing the center O of the guide tube 43 is represented by L. Note that the center O of the guide tube 43 is also the center of the valve rod 41 of the main stop valve 40.

In this case, a side surface corresponding to regions each having a center at the center O of the guide tube 43 and each having an angle $\theta$ in each direction from the straight line L (region having an angle $2\theta$) is defined as the side surface of the guide tube 43 on the drain discharge hole 23 side. In the above-described example, this angle $\theta$ is 90 degrees, and the range of the side surface of the guide tube 43 on the drain discharge hole 23 side is the half circumference of the side surface of the guide tube 43 which is the cylinder.

The angle $\theta$ is preferably set to 15 to 90 degrees, for instance. Setting the angle $\theta$ within this range makes it possible to reduce the velocity of the flow toward the drain discharge hole 23, out of the flows of the steam F along the side surface of the guide tube 43.

In the steam valve 12 including such a flow direction changing part 80, the partial steam F of the steam having passed between the valve element 32 of the steam control valve 30 and the valve seat 60 flows along the side surface of the guide tube 43. The steam F flowing along the side surface of the guide tube 43 on the drain discharge hole 23 side enters the inside of the groove portions 100 as illustrated in FIG. 9 and FIG. 10 and is disturbed on the surfaces of the groove portions 100 to form vortices. Consequently, the flow direction of the steam F is changed, and in addition, the flow of the steam F is damped, so that the velocity of the steam F decreases. Then, the steam F flowing down up to the downstream side of the guide tube 43 has a low velocity.

Even if the flow of the steam F having such a low velocity reaches the drain discharge hole 23, the pressure fluctuation transmitted to the drain pipe 70 via the drain discharge hole 23 is very small. This can prevent the abnormal temperature increase of the drain pipe 70.

As described above, according to the steam valve 12 of the third embodiment, the presence of the flow direction changing part 80 makes it possible to not only change the flow direction in which the steam flows toward the drain discharge hole 23 but also damp the flow of the steam F to decrease the velocity of the flow. Accordingly, the pressure fluctuation transmitted to the drain pipe 70 via the drain discharge hole 23 is small. This can prevent the abnormal temperature increase of the drain pipe 70, enabling to provide the highly reliable steam valve 12.

Fourth Embodiment

Figure 12:
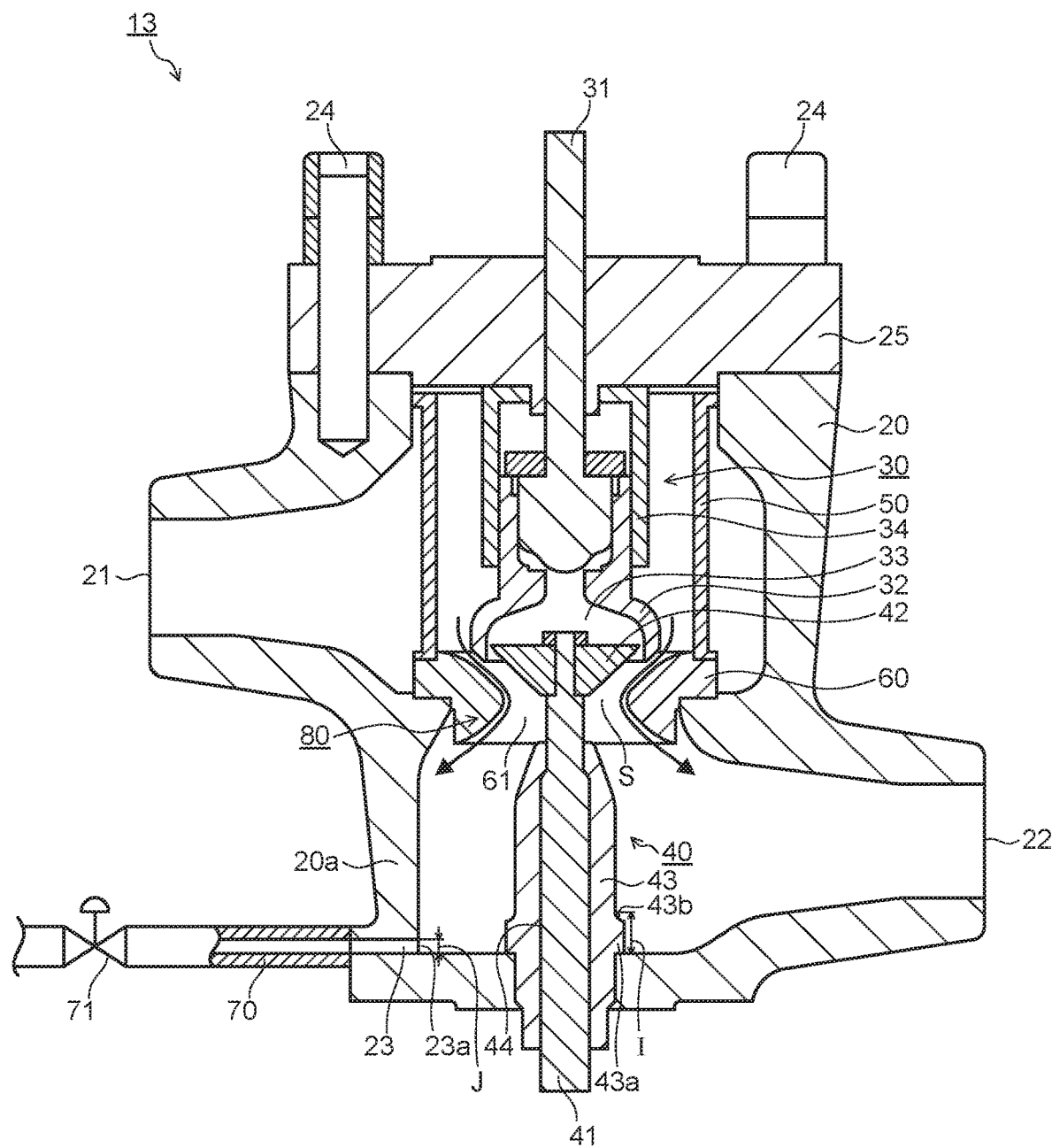
FIG. 12 is a view illustrating a vertical cross section of a steam valve of a fourth embodiment.

FIG. 12 is a view illustrating a vertical cross section of a steam valve 13 of a fourth embodiment. The structure of the steam valve 13 of the fourth embodiment is the same as the structure of the steam valve 10 of the first embodiment except the structure of the flow direction changing part 80. Therefore, the flow direction changing part 80 is mainly described here.

As illustrated in FIG. 12, the flow direction changing part 80 is the valve seat 60 whose inner peripheral surface is curved such that a passage cross section of the steam passage 61 at the center of the valve seat 60 becomes larger as it goes more downward from a throat portion S of the steam passage 61. Here, the throat portion S is a cross section where the passage cross section becomes smallest in the steam passage at the center of the valve seat 60.

For example, with the passage sectional area at the throat portion S being 1, the passage sectional area at an outlet of the steam passage 61 is preferably about 2.2 to 3 times. By setting it within this range, the flow of the steam having passed between the valve element 32 of the steam control valve 30 and the valve seat 60 can spread outward. The curve of the inner peripheral surface of the valve seat 60 in order for the passage sectional area at the outlet of the steam passage 61 to fall within the aforesaid range is preferably gentle enough to prevent the separation of the flow.

In the steam valve 12 including such a flow direction changing part 80, the steam having passed between the valve element 32 of the steam control valve 30 and the valve seat 60 flows along the inner peripheral surface of the valve seat 60. Then, at the outlet of the valve seat 60, a flow spreading outward is obtained.

In this case, the flow of the steam along the side surface of the guide tube 43 is minimized. Accordingly, the flow of the steam flowing along the side surface of the guide tube 43, and on the downstream side, flowing toward the drain discharge hole 23 is minimized. Accordingly, the pressure fluctuation of the flow of the steam is not transmitted to the drain pipe 70 via the drain discharge hole 23. This can prevent the abnormal temperature increase of the drain pipe 70.

The flow having passed through the steam passage 61 of the valve seat 60 to spread outward spreads in the steam passage downstream of the valve seat 60 to flow toward the steam outlet 22.

As described above, according to the steam valve 13 of the fourth embodiment, the presence of the flow direction changing part 80 can minimize the flow of the steam along the side surface of the guide tube 43. Accordingly, the pressure fluctuation due to the steam flowing toward the drain discharge hole 23 is not transmitted to the drain pipe 70. This can prevent the abnormal temperature increase of the drain pipe 70, enabling to provide the highly reliable steam valve 13.

Fifth Embodiment

Figure 13:
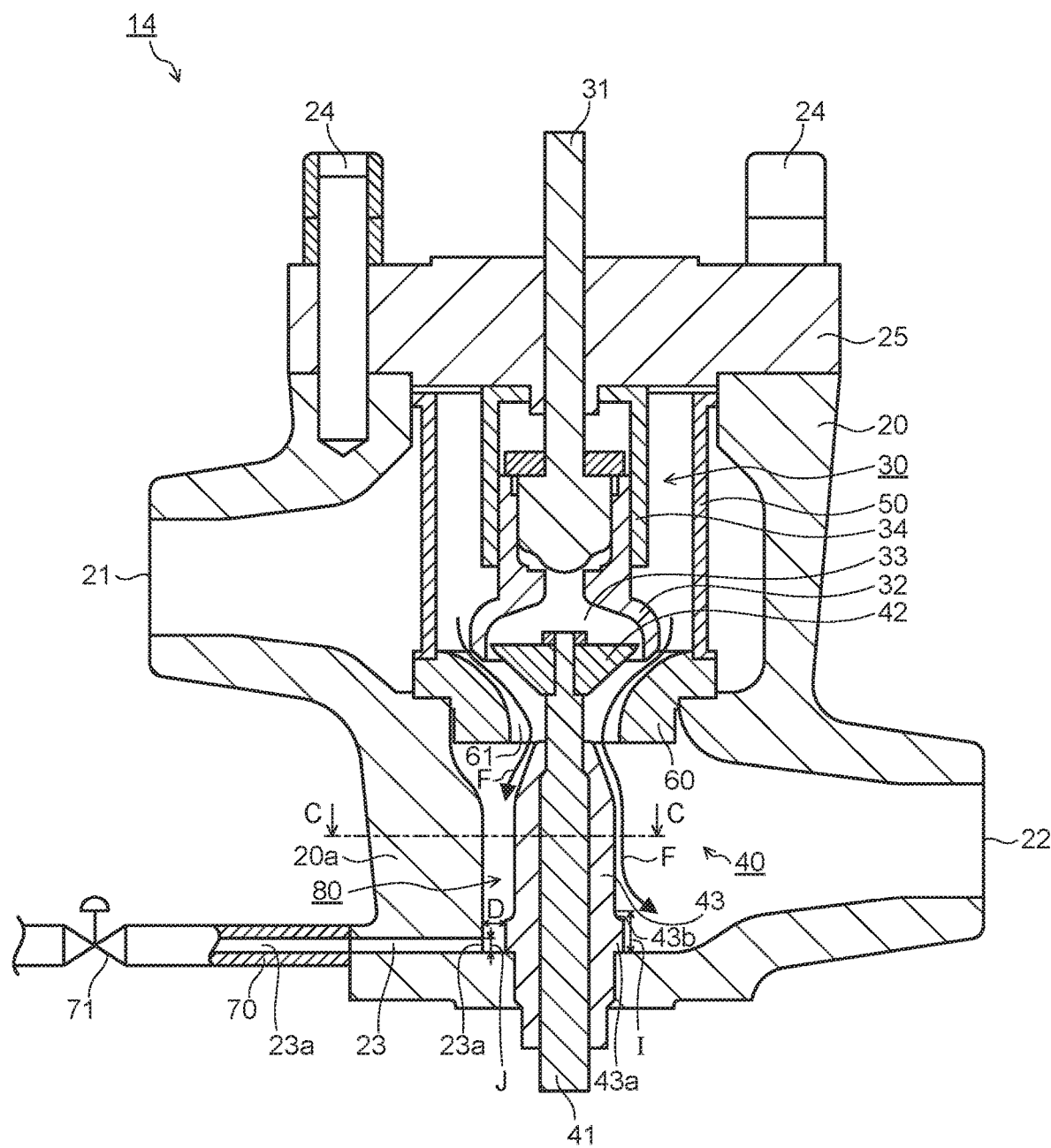
FIG. 13 is a view illustrating a vertical cross section of a steam valve of a fifth embodiment.
Figure 14:
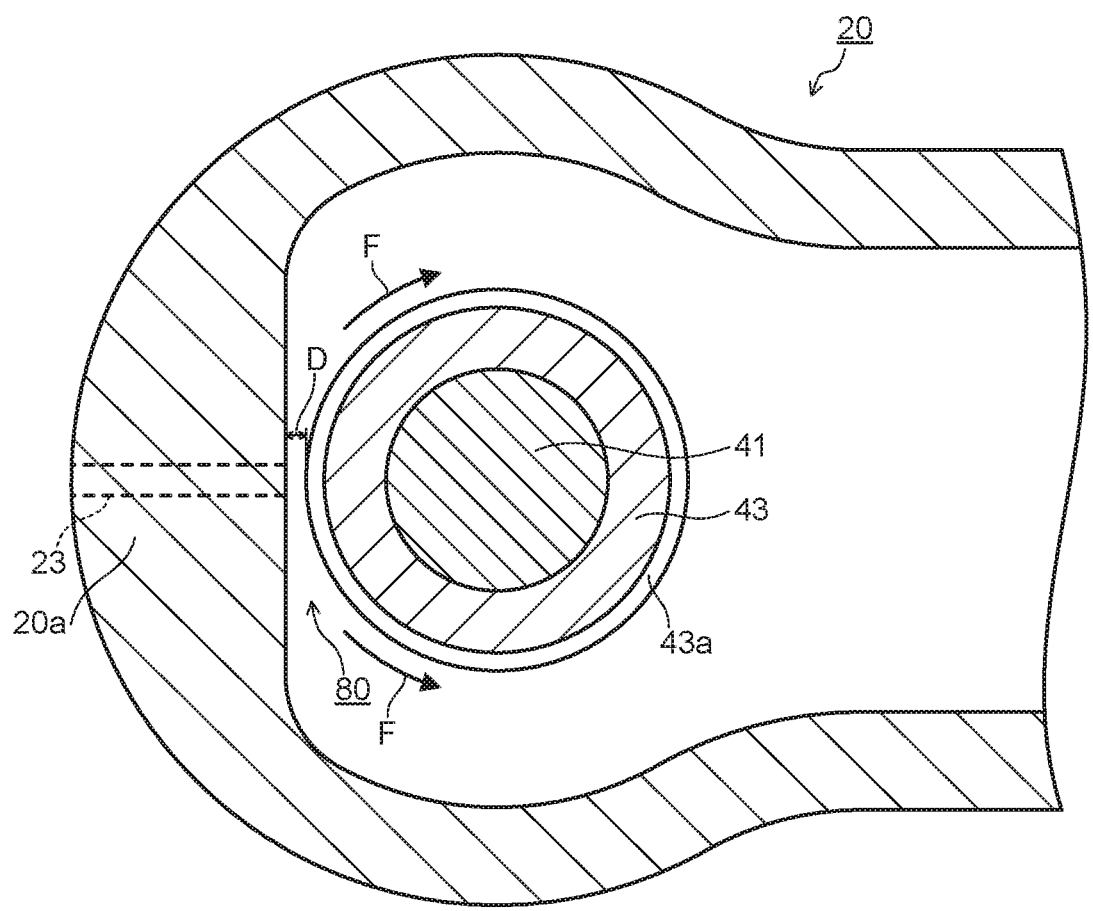
FIG. 14 is a view illustrating a C-C cross section in FIG. 13.

FIG. 13 is a view illustrating a vertical cross section of a steam valve 14 of a fifth embodiment. FIG. 14 is a view illustrating a C-C section in FIG. 13. The structure of the steam valve 14 of the fifth embodiment is the same as the structure of the steam valve 10 of the first embodiment except the structure of the flow direction changing part 80. Therefore, the flow direction changing part 80 is mainly described here.

As illustrated in FIG. 13 and FIG. 14, the flow direction changing part 80 is constituted by narrowing a gap between the sidewall 20a of the casing 20 on the side where the drain discharge hole 23 is formed and the guide tube 43. For example, as illustrated in FIG. 13 and FIG. 14, the sidewall 20a of the casing 20 on the side where the drain discharge hole 23 is formed protrudes toward the guide tube 43, so that the gap between the sidewall 20a and the guide tube 43 can be small.

Here, as illustrated in FIG. 13, in the gap, an interval between the sidewall 20 a of the casing 20 and the flange portion 43a of the guide tube 43 is smallest, in the vertical section of the steam valve 14 including the center of the drain discharge hole 23. A distance D of this smallest gap is set to the minimum distance allowing the drain to be led to the drain discharge hole 23, for instance.

In the steam valve 14 including such a flow direction changing part 80, the partial steam F of the steam F having passed between the valve element 32 of the steam control valve 30 and the valve seat 60 flows along the side surface of the guide tube 43. However, the gap between the sidewall 20a of the casing 20 where the drain discharge hole 23 is formed and the guide tube 43 is small. Accordingly, the steam F flows along the side surface of the guide tube 43 so as to keep away from this gap.

Accordingly, there occurs no flow of the steam F toward the drain discharge hole 23. Consequently, the pressure fluctuation of the flow of the steam F is not transmitted to the drain pipe 70 via the drain discharge hole 23. This can prevent the abnormal temperature increase of the drain pipe 70.

As described above, according to the steam valve 14 of the fifth embodiment, owing to the presence of the flow direction changing part 80, there occurs no flow of the steam F toward the drain discharge hole 23. Accordingly, there is no transmission of the pressure fluctuation to the drain pipe 70 due to the steam flowing toward the drain discharge hole 23. This can prevent the abnormal temperature increase of the drain pipe 70, enabling to provide the highly reliable steam valve 14.

In the example described here, the sidewall 20a of the casing 20 on the side where the drain discharge hole 23 is formed protrudes toward the guide tube 43 to narrow the gap between the sidewall 20a and the guide tube 43, but this structure is not restrictive.

For example, in a cross section corresponding to the cross section illustrated in FIG. 13, a structure composed of the steam control valve 30, the main stop valve 40, the valve seat 60, and the strainer 50 may be put closer to the sidewall 20a of the casing 20 on the side where the drain discharge hole 23 is formed. That is, the center axis of the aforesaid structure may be deviated toward the drain discharge hole 23 from the vertical center axis of the steam passage downstream of the valve seat 60. In this case as well, the same operation and effect as the operation and effect in the steam valve 14 illustrated in FIG. 13 can be obtained.

Sixth Embodiment

Figure 15:
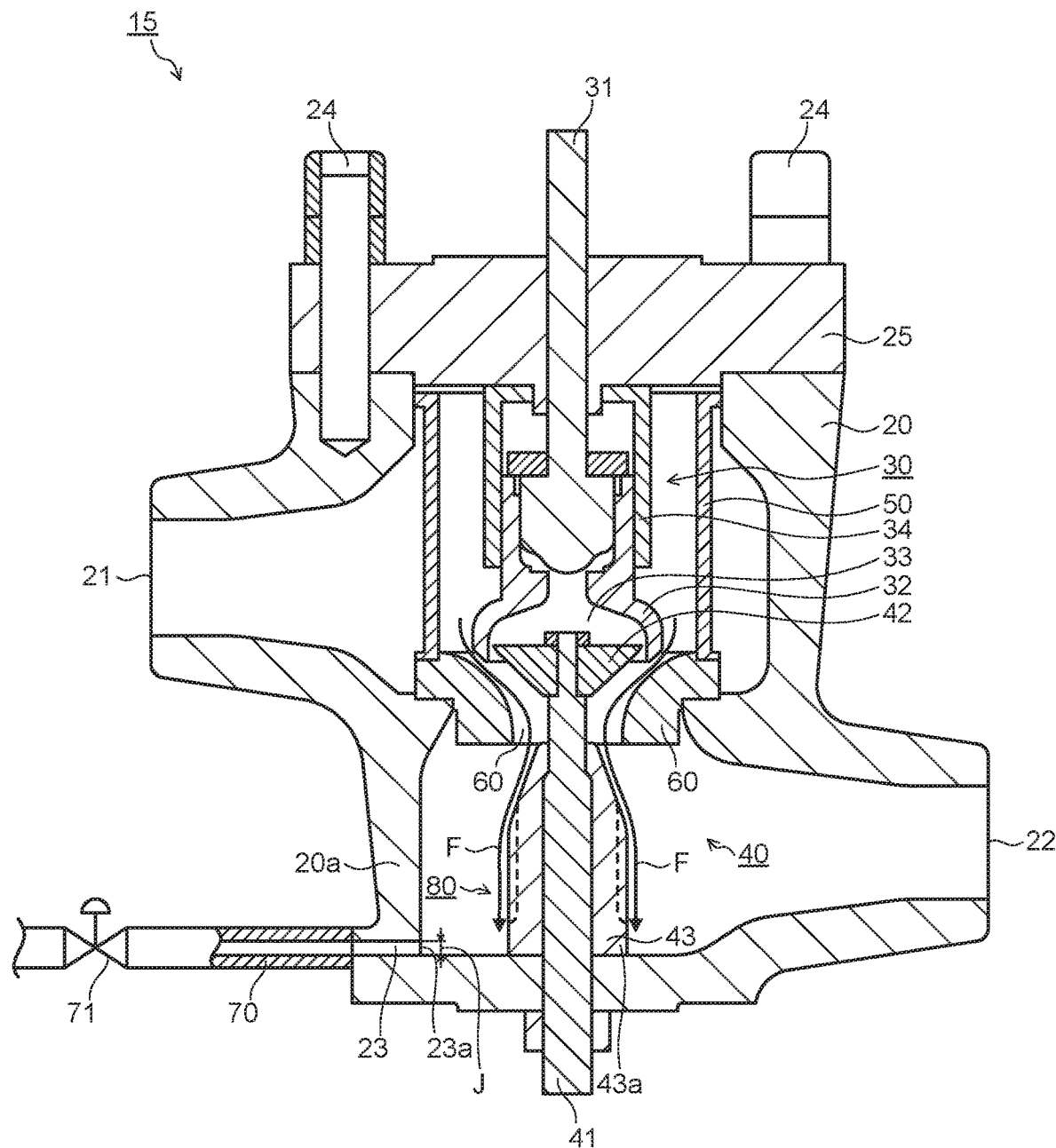
FIG. 15 is a view illustrating a vertical cross section of a steam valve of a sixth embodiment.

FIG. 15 is a view illustrating a vertical cross section of a steam valve 15 of a sixth embodiment. The structure of the steam valve 15 of the sixth embodiment is the same as the structure of the steam valve 10 of the first embodiment except the structure of the flow direction changing part 80. Therefore, the flow direction changing part 80 is mainly described here.

As illustrated in FIG. 15, the flow direction changing part 80 is constituted by making the outside diameter of the sidewall of the guide tube 43 above the flange portion 43a equal to the outside diameter of the flange portion 43a. Here, in FIG. 15, the shape before the outside diameter of the sidewall above the flange portion 43a is increased is illustrated by the broken line. The outside diameter of the sidewall of the guide tube 43 above the flange portion 43a may be larger than the outside diameter of the flange portion 43a. That is, the outside diameter of the sidewall of the guide tube 43 above the flange portion 43a is set equal to or larger than the outside diameter of the flange portion 43a.

In the steam valve 15 including such a flow direction changing part 80, the partial steam F of the steam F having passed between the valve element 32 of the steam control valve 30 and the valve seat 60 flows along the side surface of the guide tube 43. The steam F flowing along the side surface of the guide tube 43 flows substantially vertically downward to collide with the bottom surface of the casing 20. The steam F which has collided with the bottom surface of the casing 20 flows toward the steam outlet 22 together with other steam.

Accordingly, there occurs substantially no flow of the steam F toward the drain discharge hole 23. Consequently, the pressure fluctuation of the flow of the steam F is not transmitted to the drain pipe 70 via the drain discharge hole 23. This can prevent the abnormal temperature increase of the drain pipe 70.

As described above, according to the steam valve 15 of the sixth embodiment, owing to the presence of the flow direction changing part 80, there occurs substantially no flow of the steam F toward the drain discharge hole 23. Accordingly, there is no transmission of the pressure fluctuation to the drain pipe 70 due to the steam flowing toward the drain discharge hole 23. This can prevent the abnormal temperature increase of the drain pipe 70, enabling to provide the highly reliable steam valve 15.

Seventh Embodiment

Figure 16:
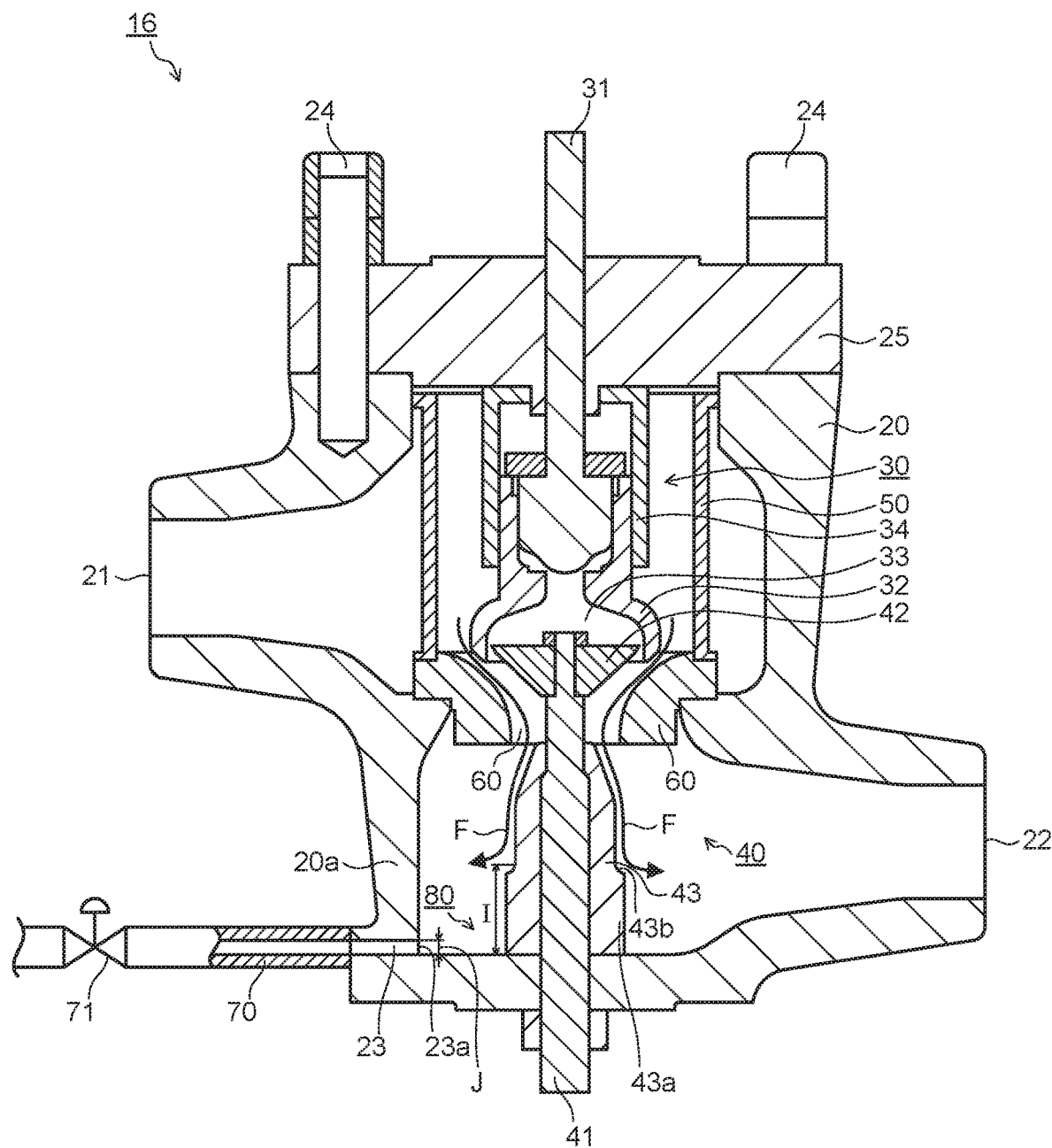
FIG. 16 is a view illustrating a vertical cross section of a steam valve of a seventh embodiment.

FIG. 16 is a view illustrating a vertical cross section of a steam valve 16 of a seventh embodiment. The structure of the steam valve 16 of the seventh embodiment is the same as the structure of the steam valve 10 of the first embodiment except the structure of the flow direction changing part 80. Therefore, the flow direction changing part 80 is mainly described here.

As illustrated in FIG. 16, the flow direction changing part 80 is constituted by making the height I of the flange portion 43a of the guide tube 43 three times or more the axial-direction distance J between the bottom surface of the casing 20 and the upper end of the drain discharge hole 23. Note that the axial direction is synonymous with the axial direction of the steam control valve 30 and the main stop valve 40. That is, the axial direction is the up and down direction in FIG. 16.

The height I of the flange portion 43a, which is ordinarily set less than three times the distance J as described above, falls here within a range exceeding this range. That is, the height I of the flange portion 43a in the seventh embodiment is set larger than the aforesaid ordinary height I of the flange portion 43a.

In the steam valve 16 including such a flow direction changing part 80, the partial steam F of the steam F having passed between the valve element 32 of the steam control valve 30 and the valve seat 60 flows along the side surface of the guide tube 43. The height I of the flange portion is larger than the ordinary height I of the flange portion 43a. Accordingly, more upstream than ordinarily, the component of velocity directed outward is added and as illustrated in FIG. 16, the steam F flows outward.

Accordingly, there occurs substantially no flow of the steam F toward the drain discharge hole 23. Consequently, the pressure fluctuation of the flow of the steam F is not transmitted to the drain pipe 70 via the drain discharge hole 23. This can prevent the abnormal temperature increase of the drain pipe 70.

As described above, according to the steam valve 16 of the seventh embodiment, owing to the presence of the flow direction changing part 80, there occurs substantially no flow of the steam F toward the drain discharge hole 23. Accordingly, there is no transmission of the pressure fluctuation to the drain pipe 70 due to the steam flowing toward the drain discharge hole 23. This can prevent the abnormal temperature increase of the drain pipe 70, enabling to provide the highly reliable steam valve 16.

Eight Embodiment

Figure 17:
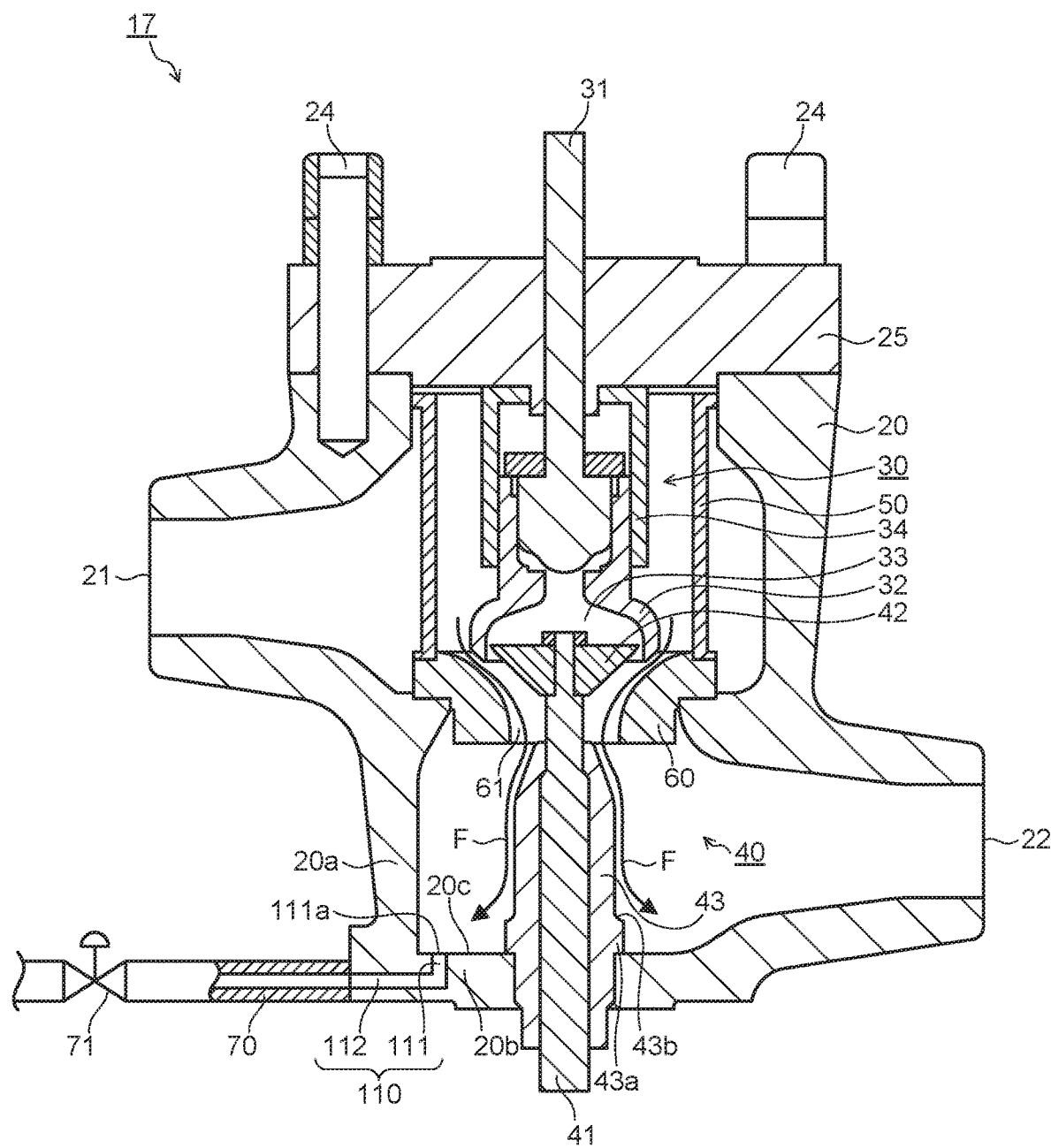
FIG. 17 is a view illustrating a vertical cross section of a steam valve of an eighth embodiment.
Figure 18:
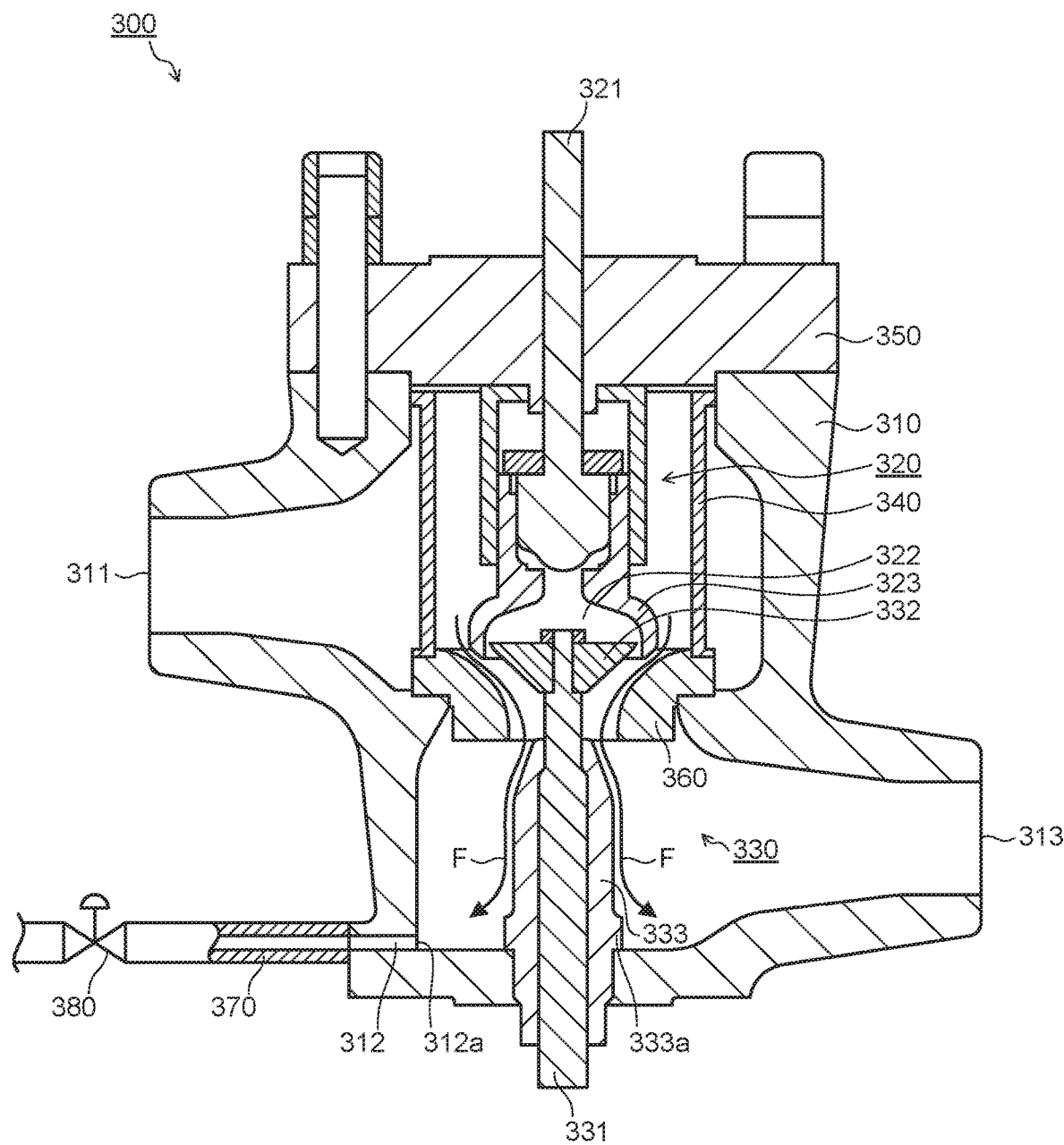
FIG. 18 is a view illustrating a vertical cross section of a conventional steam valve.

FIG. 17 is a view illustrating a vertical cross section of a steam valve 17 of an eighth embodiment. The steam valve 17 of the eighth embodiment does not include the flow direction changing part 80 unlike those of the above-described embodiments. In the steam valve 17 of the eighth embodiment, the structure of a drain discharge hole 110 is different from the structure of the drain discharge hole 23 of the above-described embodiments. Therefore, the drain discharge hole 110 is mainly described here.

As illustrated in FIG. 17, the drain discharge hole 110 is formed in a bottom wall 20b of the casing 20. The drain discharge hole 110 includes a vertical hole 111 extending vertically downward from an inner surface 20c of the bottom wall 20b and a lateral hole 112 communicating with the vertical hole 111 and laterally penetrating. The lateral hole 112 is formed in the horizontal direction, for instance. Alternatively, the lateral hole 112 may be formed so as to slant downward toward the side where the lateral hole 112 penetrates.

Here, the drain discharge hole 110 is formed with a hole diameter large enough for the drain to pass therethrough. In view of preventing the steam from entering the drain discharge hole 110, the drain discharge hole 110 preferably has the minimum hole diameter allowing the passage of the drain.

On a side surface of the bottom wall 20b through which the lateral hole 112 penetrates, the drain pipe 70 is provided so as to communicate with the lateral hole 112. The drain pipe 70 is provided with the shutoff valve 71.

In the steam valve 17 including such a drain discharge hole 110, the partial steam F of the steam F having passed between the valve element 32 of the steam control valve 30 and the valve seat 60 flows along the side surface of the guide tube 43. When the steam F flows along the flange portion 43a of the guide tube 43, the component of velocity directed outward is added, and as illustrate in FIG. 17, the steam F flows outward.

Accordingly, there occurs substantially no flow of the steam F toward an opening 111a of the vertical hole 111. Consequently, there is no transmission of the pressure fluctuation to the drain pipe 70 due to the steam flowing toward the drain discharge hole 110. Note that the flow of the steam F toward the drain discharge hole 110 (opening 111a) refers to a flow of the steam flowing into the opening 111a of the drain discharge hole 110 mainly due to the dynamic pressure of the flow. Further, for example, even if the partial steam F enters the vertical hole 111, the steam F does not enter the lateral hole 112 bending perpendicularly from the vertical hole 111, owing to a large pressure loss. For the above-described reasons, it is possible to prevent the abnormal temperature increase of the drain pipe 70 and provide the highly reliable steam valve 16.

As described above, according to the steam valve 17 of the eighth embodiment, owing to the above-described structure of the drain discharge hole 110, there occurs no flow of the steam F toward the drain discharge hole 110 (opening 111a). Accordingly, there is no transmission of the pressure fluctuation to the drain pipe 70 due to the steam flowing toward the drain discharge hole 110. This can prevent the abnormal temperature increase of the drain pipe 70, enabling to provide the highly reliable steam valve 15.

Here, as an example of a steam valve, the above embodiments describe the steam valve which is provided in the main steam pipe and in which the steam control valve 30 and the main stop valve 40 are combined. However, the structures of the embodiments are applicable also to, for example, a steam valve which is provided in the high-temperature reheat pipe and in which an intercept valve and a reheat steam stop valve are combined. In this case, the same operation and effect as those when the structures of the embodiments are applied to the steam valve in which the steam control valve 30 and the main stop valve 40 are combined can be obtained.

According to the above-described embodiments, it is possible to prevent an abnormal temperature increase of a drain pipe to provide a highly reliable steam valve.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A steam valve comprising:
   a first valve element which is provided to be movable in an up and down direction and adjusts a flow rate of steam;
   a second valve element which is provided under the first valve element coaxially with the first valve element to be movable in the up and down direction and shuts off a flow of the steam;
   a valve seat with which the first valve element and the second valve element come into and out of contact;
   a guide tube slidably supporting a valve rod including the second valve element, and having a flange portion protruding outward at a bottom side of the guide tube;
   a casing housing the first valve element, the second valve element, the valve seat, and the guide tube;
   a drain discharge hole formed in a sidewall of the casing at a bottom side;
   a drain pipe provided with a shutoff valve and communicating with the drain discharge hole; and
   a flow direction changing part configured to change a direction in which the steam, having passed between the first valve element and the valve seat and flowing along the guide tube, flows toward the drain discharge hole, the flow direction changing part being provided adjacent to the guide tube,
   wherein the flow direction changing part is a ridge part protruding outward from a side surface of the guide tube on a drain discharge hole side and extending in an axial direction.

2. The steam valve according to claim 1, wherein the ridge part has a circumferential width that becomes smaller upward.

3. The steam valve according to claim 1, wherein an upper end portion of the flange portion is a surface slanting downward toward a bottom of the casing.

4. The steam valve according to claim 1, wherein the ridge part has a rectangular or trapezoidal shape in axial-direction cross section.

5. The steam valve according to claim 1, wherein an upper end of the ridge part has a tapered shape.

* * * * *